Patented May 31, 1949

2,471,570

UNITED STATES PATENT OFFICE 2,471,570

ADDITION OF CHLORINATED ACETIC ACID DERIVATIVES TO OLEFINS

Morris S. Kharasch and Wilbert H. Urry, Chicago, Ill., assignors to United States Rubber Company, New York, N. Y., a corporation of New Jersey No Drawing. Application August 23, 1946, Serial No. 692,734

4 Claims. (Cl. 260—408)

This invention relates to the addition of derivatives of α-halogenated carboxylic acids to organic compounds containing carbon-to-carbon unsaturation. More particularly, it relates to the addition of chloro acetic acid chlorides or esters to olefins containing at least three carbon atoms.

One object of this invention is to provide new and useful halogen-containing derivatives of organic acids. Another object of this invention is to provide a method of preparing certain α-chloro aliphatic acid derivatives.

We have found that esters or chlorides of chloro acetic acids add to organic compounds containing olefinic unsaturation to form new and useful chlorine-substituted carboxylic acids when a mixture of the chloro acid derivative and the olefinic compound is heated in the presence of a small amount of a diacyl peroxide or other peroxy compound capable of decomposing thermally to yield free organic radicals.

In particular, we have found the α-halo acid derivatives as exemplified by the derivatives of chlorinated acetic acids will add to olefins to give excellent yields of the following types of compounds:

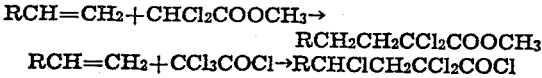

R is a saturated hydrocarbon radical.

The temperature at which the reaction between the α-halo acid derivative and the olefinic compound is carried out is not critical except that it should be high enough to cause decomposition of the peroxy compound used as the promoter. In general, temperatures in the range from 60° C.–150° C. will be satisfactory although higher or lower temperatures may be employed, if desired. The time of heating is not critical and it is customary to continue the heating at least until an appreciable quantity of the desired addition product is formed.

The amount of the diacyl peroxide employed may range from 1 to 20% by weight of the olefinic compound used although larger amounts may be used, if desired. As a rule, the yield of the desired product will depend upon the amount of promoter used, larger quantities giving higher yields and conversely smaller quantities giving somewhat smaller yields. The promoter may be added at the start of the reaction or in increments during the heating period. The latter method is preferable in many cases.

As a suitable promoter, we may use any diacyl peroxide such as benzoyl peroxide, acetyl peroxide, or we may use any peroxy compound which decomposes to give free radicals, as for example, ascaridol, tertiary butyl hydroperoxide, etc.

The amount of chloro acid derivative used should preferably be equal to at least one mole for each mole of olefin used, although the molar ratio of halo acid to olefin may be increased considerably, especially where it is desired to reduce the yield of polymeric addition products to a minimum.

Among the α-halo acid derivatives suitable for this invention are the chlorides and esters of the chlorinated acetic acids such as, for example, trichloro acetyl chloride, methyl trichloro acetate, ethyl trichloro acetate, dichloro acetyl chloride, methyl dichloro acetate, ethyl dichloro acetate, monochloro acetyl chloride, methyl monochloro acetate, and ethyl monochloro acetate. In addition to the methyl and ethyl esters mentioned above, other corresponding alkyl esters such as propyl, butyl, amyl, etc., may be used.

Among the olefinic hydrocarbons containing at least three carbon atoms to which the chlorinated acetic acid derivatives will add under the conditions of the present invention, the following may be mentioned: propylene, butene-1, hexene-1, octene-1, and other unsaturated hydrocarbons containing a terminal double bond. Lower yields of the desired addition products are obtained when the double bond in the unsaturated compound is nonterminal, such as in hexene-3, octene-2, butent-2. Finally, very poor yields of the desired compounds are obtained when a hydrogen atom of the ethylene molecule is replaced by an aromatic group as in styrene, or vinyl naphthalene. In the case of these latter compounds only polymers are formed which contain many molecules of the unsaturated compound per molecule of the chlorinated acid halide or ester.

In order not to extend unduly the number of examples, the following few illustrative examples of the invention are cited:

*Example 1*

A mixture containing 32 parts of octene-1 and 177 parts of methyl dichloro acetate is heated in a flask for 4 hours at 100° C. in the presence of 2 parts of diacetyl peroxide. About 57 parts of addition product remains in the flask after removal of the starting materials at reduced pressure. This material upon distillation gives 29 parts of a fraction which boils at 74–75° C. at 0.3 mm. pressure and has a refractive index $n_D^{20} = 1.4561$. This material is a halo acid derivative with the following properties:

Cl content _____ per cent__ 28.17
Mol. weight _____ 255

The reaction may be represented as follows:

$CH_3(CH_2)_5—CH=CH_2 + HCCl_2COOCH_3 \rightarrow$
$CH_3(CH_2)_6—CH_2—CCl_2COOCH_3$ The product is named methyl α,α-dichlorocaprate.

The calculated chlorine content of this compound is 27.85 and the molecular weight is 255. The structure of this compound was confirmed by well established chemical procedures.

The residue is distilled in a molecular still and is found to be a mixture of dimethyl tetrachloro succinate and the condensation product of two molecules of octene-1 and one of methyl dichloro acetate.

Example 2

A better yield of the mono addition product and a smaller amount of the higher condensation products (two or more molecules of octene-1 to one molecule of chlorinated acetic acid derivative) are obtained when 25 parts of octene-1 and 180 parts of trichloro acetyl chlorine are heated in a flask in the presence of 2 parts of diacetyl peroxide and the reaction mixture worked up as in Example 1. The addition product obtained is α,α,γ,-trichloro capryl chloride (B. P. 123–126° C. at 0.3 mm. $n_D^{20} = 1.4839$) and the amount obtained corresponds to 81% yield based on the octene used. The analysis of the product shows the following:

Cl, 48.1%; mol. wt. 294. Calculated for $C_{10}H_{16}OCl_4$: Cl, 48.2%; mol. wt. 294.

$CH_3(CH_2)_5CH=CH_2 + Cl_3CCOCl \rightarrow$
$CH_3(CH_2)_5CHClCH_2CCl_2COCl$

The structure of this compound was confirmed by well established chemical procedures.

Example 3

The condensation of methyl monochloro acetate and octene-1 under the same conditions as in Examples 1 and 2 gave 10% of an α-halo acid derivative based on the octene-1 used.

Having thus described our invention, what we claim and desire to protect by Letters Patent is:

1. An adduct of a compound of the formula $RCH=CH_2$ where R is a saturated hydrocarbon radical in which the carbon atoms range from 1 to 6 and an acid chloride of a chloracetic acid which contains two to three alpha-chlorine atoms.

2. A method of forming addition products which comprises catalytically activating with a peroxy compound catalyst a mix composed of an olefin of the formula $RCH=CH_2$ where R is a saturated hydrocarbon radical in which the carbon atoms range from 1 to 6 and at least one molecular proportion of an acid chloride of a chloroacetic acid for each molecular proportion of the olefin.

3. Alpha,alpha,gamma-trichloro capryl chloride.

4. A method of forming alpha,alpha,gamma-trichloro capryl chloride which comprises reacting octene-1 with at least one molecular proportion of trichloro acetyl chloride for each molecular proportion of octene-1, in the presence of a peroxy compound catalyst.

MORRIS S. KHARASCH.
WILBERT H. URRY.

REFERENCES CITED

The following references are of record in the file of this patent:

Servais, "Recueil des travaux chim. des Pays-Bas," volume 20 (1901), pages 46–7.

Certificate of Correction

Patent No. 2,471,570. May 31, 1949.

MORRIS S. KHARASCH ET AL.

It is hereby certified that errors appear in the printed specification of the above numbered patent requiring correction as follows:

Column 2, line 33, for "butent" read *butene*; column 3, line 27, for the word "chlorine" read *chloride*; line 37, for "Cl, 48.2%" read *Cl–48.2%*;

and that the said Letters Patent should be read with these corrections therein that the same may conform to the record of the case in the Patent Office.

Signed and sealed this 25th day of October, A. D. 1949.

[SEAL]

THOMAS F. MURPHY,
*Assistant Commissioner of Patents.*